United States Patent
Tenghamn

(10) Patent No.: US 10,534,099 B2
(45) Date of Patent: Jan. 14, 2020

(54) MATCHING COMBINED SENSITIVITIES OF ARRAYS OF HYDROPHONES

(71) Applicant: PGS Geophysical AS, Oslo (NO)

(72) Inventor: Stig Rune Lennart Tenghamn, Houston, TX (US)

(73) Assignee: PGS Geophysical AS, Oslo (NO)

( * ) Notice: Subject to any disclaimer, the term of this patent is extended or adjusted under 35 U.S.C. 154(b) by 295 days.

(21) Appl. No.: 15/704,835

(22) Filed: Sep. 14, 2017

(65) Prior Publication Data

US 2018/0106915 A1 Apr. 19, 2018

Related U.S. Application Data

(60) Provisional application No. 62/409,970, filed on Oct. 19, 2016.

(51) Int. Cl.
*G01V 1/18* (2006.01)
*G01V 1/20* (2006.01)

(52) U.S. Cl.
CPC .............. *G01V 1/186* (2013.01); *G01V 1/201* (2013.01)

(58) Field of Classification Search
CPC .......... G01V 1/186; G01V 1/201; G01V 1/38; G01V 13/00; G01V 1/162; G01V 2210/1423
USPC ....................................................... 367/22
See application file for complete search history.

(56) References Cited

U.S. PATENT DOCUMENTS

| | | | |
|---|---|---|---|
| 3,832,762 A | 9/1974 | Johnston et al. | |
| 3,988,620 A | 10/1976 | McDavid | |
| 4,799,752 A | 1/1989 | Carome | |
| 5,392,258 A | 2/1995 | Gabrielson et al. | |
| 6,853,604 B2 * | 2/2005 | Spackman ............... | G01V 1/16 367/154 |
| 8,730,766 B2 | 5/2014 | Lambert et al. | |
| 9,019,797 B2 | 4/2015 | Goujon | |
| 2006/0133202 A1 | 6/2006 | Tenghamn | |
| 2013/0044565 A1 | 2/2013 | Barr et al. | |
| 2015/0192687 A1 | 7/2015 | Goujon | |

OTHER PUBLICATIONS

Extended European Search Report for related EP Application 17197179.9, dated Mar. 15, 2018 (8 pgs).
Murphy, "Estimation of Acoustic Particle Motion and Source Bearing Using a Drifting Hydrophone Array Near a River Current Turbine to Assess Disturbances to Fish"; Master of Science in Mechanical Engineering, University of Washington, (2015) (52 pgs) https://depts.washington.edu/nnmrec/docs/murphy_paul_thesis.pdf.
Nedelec, et al., "Particle motion: the missing link in underwater acoustic ecology"; British Ecological Society, Methods in Ecology and Evolution. (2016) vol. 7, (pp. 836-842) (7 pgs) http://onlinelibrary.wiley.com/doi/10.1111/2041-210X.12544/pdf.

* cited by examiner

*Primary Examiner* — Daniel L Murphy

(57) ABSTRACT

A system can include a first array of hydrophones and a second array of hydrophones. Each of the hydrophones can include a first detector and a second detector. A sensitivity of the first detector can be matched with a sensitivity of the second detector and a combined sensitivity of the first array of hydrophones can be matched with a combined sensitivity of the second array of hydrophones.

20 Claims, 7 Drawing Sheets

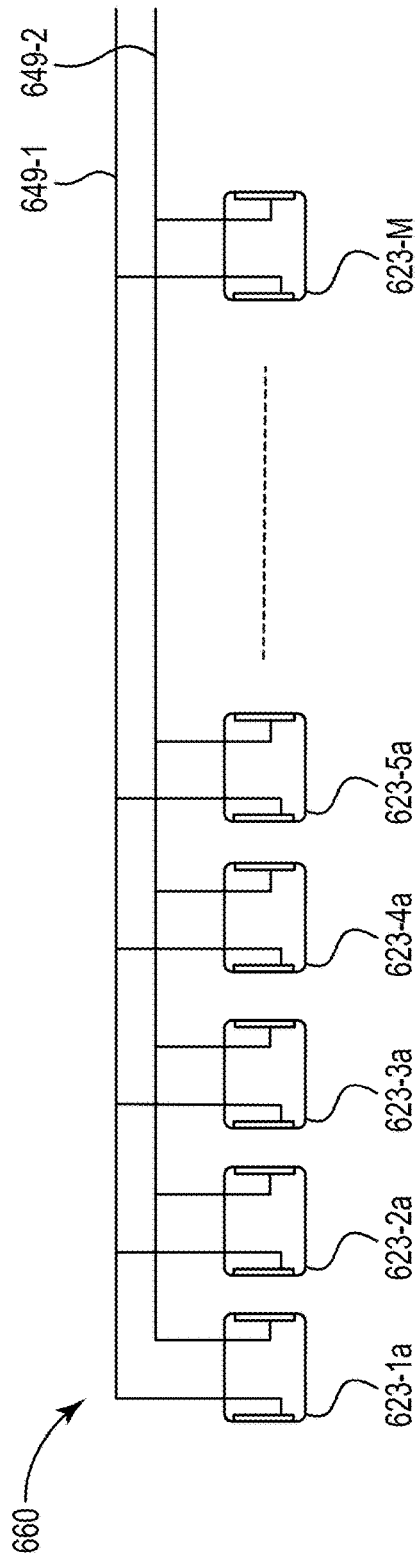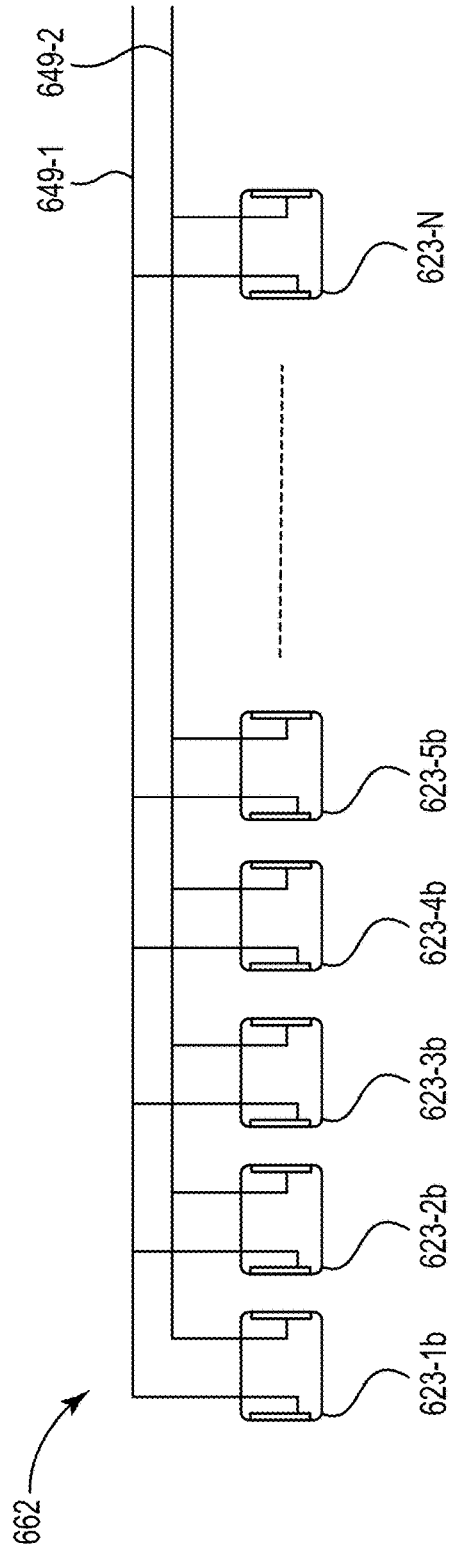

MATCHING COMBINED SENSITIVITIES OF ARRAYS OF HYDROPHONES

CROSS REFERENCE TO RELATED APPLICATIONS

This application claims priority to U.S. Provisional Application 62/409,970, filed Oct. 19, 2016, which is incorporated by reference.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more sources below the water surface and over a subterranean formation to be surveyed for mineral deposits. Receivers may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more sources, which can be air guns, marine vibrators, electromagnetic sources, etc., to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the water surface. The receivers thereby measure a wavefield that was initiated by the actuation of the source.

BRIEF DESCRIPTION OF THE DRAWINGS

FIG. 6A illustrates a schematic diagram of a first array of hydrophones.

FIG. 6B illustrates a schematic diagram of a second array of hydrophones.

DETAILED DESCRIPTION

Figure 1:
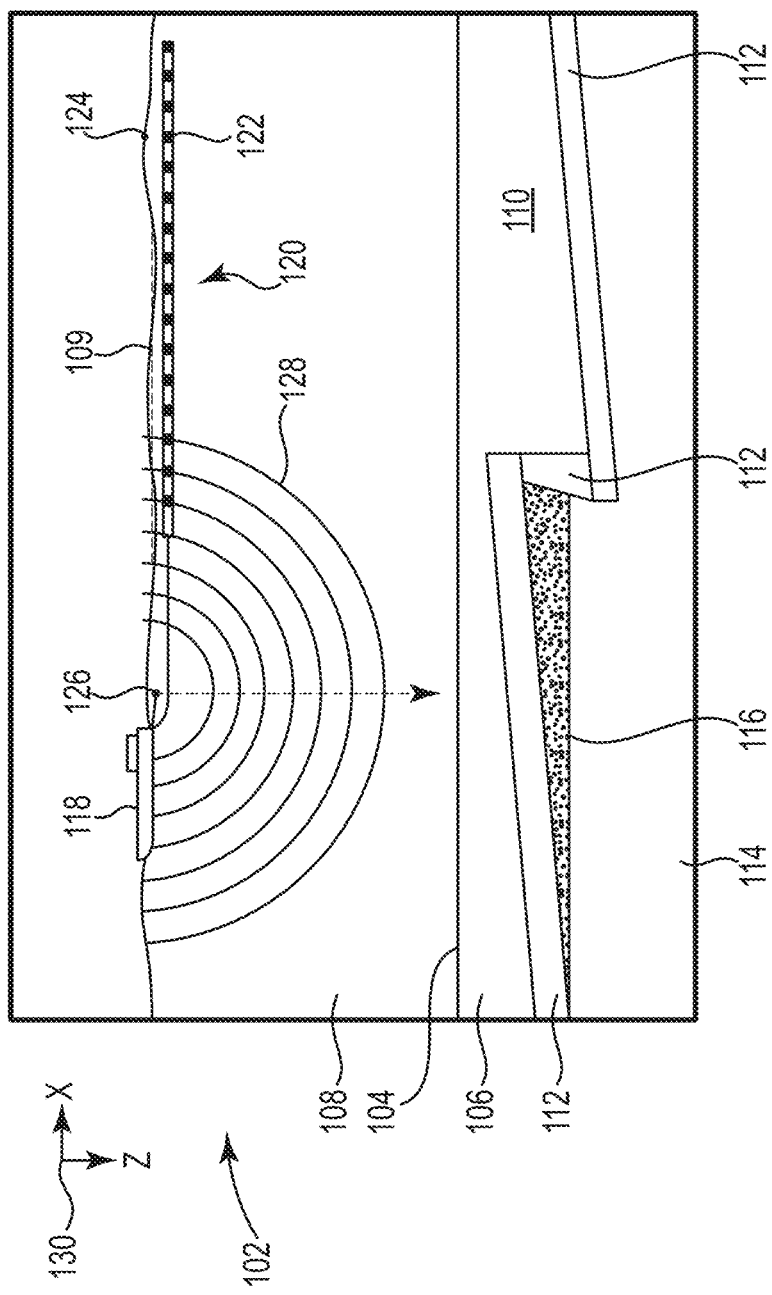
FIG. 1 illustrates an elevation or xz-plane view of marine surveying in which acoustic signals are emitted by a source for recording by receivers.

This disclosure is related generally to the field of marine surveying. Marine surveying can include, for example, seismic and/or electromagnetic surveying, among others. For example, this disclosure may have applications in marine surveying, in which one or more sources are used to generate wave-fields, and receivers (towed and/or ocean bottom) receive energy generated by the sources and affected by the interaction with a subsurface formation. The receivers thereby collect survey data, which can be useful in the discovery and/or extraction of hydrocarbons from subsurface formations.

One such receiver can include a sensor such as a hydrophone. Hydrophones, such as bender-type hydrophones, can include a first detector and a second detector. The first and second detectors of a hydrophone may be sensitive to acceleration, which may introduce noise in the output signals of the first and second detectors. However, matching the sensitivities of the first detector and the second detector of a hydrophone and orienting the first detector and the second detector such that the first detector and the second detector generate opposing electric potentials when the hydrophone is subjected to acceleration can reduce noise in the output signal caused by acceleration. As used herein, "matching sensitivities" refers to selecting a respective first detector and a respective second detector of a hydrophone such that the sensitivity of the respective first detector is equal to the sensitivity of the respective second detector. With respect to sensitivity of detectors or combined sensitivities of hydrophones or combined sensitivities of arrays of hydrophones, "equal to" means that the sensitivities are equal within an order of magnitude less than an order of magnitude of the difference between sensitivities of different detectors in a group of detectors. For example, consider a group of four hypothetical detectors having sensitivities (in generic units) of 1.01 (first detector), 1.02 (second detector), 1.11 (third detector), and 1.12 (fourth detector). The first and second detectors (and the third and fourth detectors) can be said to have equal sensitivities because the difference in sensitivities therebetween is on the order of hundredths of the generic unit (1.02−1.01=0.01), whereas the difference between the different detectors in the group is on the order of tenths of the generic unit (1.12−1.01=0.11). As used herein, "sensitivity" refers to the ratio between the output signal of a sensor, or a component thereof, such as a detector, and the property measured by the sensor, or the component thereof. For example, the units of the sensitivity of a detector or the combined sensitivity of a hydrophone, can be volts per bar (V/bar). As used herein, "combined sensitivity of a hydrophone" refers to the combination of the sensitivities of the respective first and second detectors of the hydrophone. The sensitivities of the respective first and second detectors may be combined in a number of ways known to one of ordinary skill in the art. For example, the sensitivity of the respective first detector may be averaged with the sensitivity of the respective second detector to yield the combined sensitivity of the hydrophone.

However, variations in the sensitivities of the detectors, such as those seen in manufacturing the detectors, may limit how closely the sensitivities of the detectors of a hydrophone can be matched. Thus, the hydrophones may still be susceptible to some acceleration despite matching the sensitivities of the detectors of the hydrophones. As a result, in an array of hydrophones one hydrophone may have different combined sensitivity than another hydrophone of the array. For example, vibration in a streamer including the array of hydrophones may still introduce noise in the output signal of the array of hydrophones.

In an effort to overcome variation in the sensitivities of detectors, such as that seen in manufacturing of the detectors, at least one embodiment in accordance with the present disclosure can include matching the combined sensitivity of a first array of hydrophones with the combined sensitivity of a second array of hydrophones in addition to matching the sensitivity of the first detector and the second detector of each hydrophone of the array. As used herein, "combined sensitivity of an array of hydrophones" refers to the combination of the combined sensitivities each hydrophone of the array of the hydrophones. The combined sensitivities of the hydrophones of an array of hydrophones can be combined in a number of ways known to one of ordinary skill in the art. For example, the combined sensitivities of the hydrophones of an array of hydrophones can be averaged together to yield a combined sensitivity of the array of hydrophones. By matching the combined sensitivity of the first array with the combined sensitivity of the second array, variation in the combined sensitivities of the hydrophones, such as that seen in manufacturing of the hydrophones comprising the first and second arrays, can be overcome.

Matching the combined sensitivity of a first array of hydrophones with the combined sensitivity of a second array of hydrophones can include selecting hydrophones of the first array of hydrophones, the second array of hydrophones, or the first array of hydrophones and the second array of hydrophones such that the combined sensitivity of the first array of hydrophones is equal to the combined sensitivity of the second array of hydrophones. In at least one embodiment, matching the combined sensitivity of a first array of hydrophone with the combined sensitivity of a second array of hydrophones can include selecting a first array of hydrophones and a second array of hydrophones such that the combined sensitivity of the first array of hydrophones is equal to the combined sensitivity of the second array of hydrophones.

Matching the combined sensitivity of a first array of hydrophones with the combined sensitivity of a second array of hydrophones does not necessarily mean that each hydrophone in the first array or the second array has the same combined sensitivity. Rather, for example, a first hydrophone of the first array can have a combined sensitivity that is different than a combined sensitivity of a second hydrophone of the first array. A hydrophone of the first array can have a combined sensitivity that is different than another hydrophone of the second array.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (having the potential to, being able to), not in a mandatory sense (must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 242 may reference element "42" in FIG. 2, and a similar element may be referenced as 342 in FIGS. 3A and 3B. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates an elevation or xz-plane 130 view of marine surveying in which acoustic signals are emitted by a source 126 for recording by receivers 122 for processing and analysis in order to help characterize the structures and distributions of features and materials underlying the solid surface of the earth. FIG. 1 shows a domain volume 102 of the earth's surface comprising a solid volume 106 of sediment and rock below the solid surface 104 of the earth that, in turn, underlies a fluid volume 108 of water having a water surface 109 such as in an ocean, an inlet or bay, or a large freshwater lake. The domain volume 102 shown in FIG. 1 represents an example experimental domain for a class of marine surveys, such as marine seismic surveys. FIG. 1 illustrates a first sediment layer 110, an uplifted rock layer 112, underlying rock layer 114, and hydrocarbon-saturated layer 116. One or more elements of the solid volume 106, such as the first sediment layer 110 and the uplifted rock layer 112, can be an overburden for the hydrocarbon-saturated layer 116. In some instances, the overburden may include salt.

FIG. 1 shows an example of a marine survey vessel 118 equipped to carry out marine surveys. In particular, the marine survey vessel 118 can tow one or more streamers 120 (shown as one streamer for ease of illustration) generally located below the water surface 109. The streamers 120 can be long cables containing power and data-transmission lines (electrical, optical fiber, etc.) to which receivers may be connected. In one type of marine survey, each receiver, such as the receiver 122 represented by the shaded disk in FIG. 1, comprises a pair of sensors including a motion sensor that detects particle displacement within the water by detecting particle motion variation, such as velocities or accelerations, and/or a hydrophone that detects variations in pressure. The receiver 122 can comprise a hydrophone of an array of hydrophones where the combined sensitivity of the hydrophone is matched with the combined sensitivity of the other hydrophones of the array of hydrophones. The other hydrophones of the array of hydrophones can each be a component of receivers other than the receiver 122. The streamers 120 and the marine survey vessel 118 can include sophisticated sensing electronics and data-processing facilities that allow receiver readings to be correlated with absolute positions on the water surface and absolute three-dimensional positions with respect to a three-dimensional coordinate system. In FIG. 1, the receivers along the streamers are shown to lie below the water surface 109, with the receiver positions correlated with overlying surface positions, such as a surface position 124 correlated with the position of receiver 122. The marine survey vessel 118 can also tow one or more sources 126 that produce acoustic signals as the marine survey vessel 118 and streamers 120 move across the water surface 109. Sources 126 and/or streamers 120 may also be towed by other vessels, or may be otherwise disposed in fluid volume 108. For example, receivers may be located on ocean bottom cables or nodes fixed at or near the solid surface 104, and sources 126 may also be disposed in a nearly-fixed or fixed configuration. For the sake of efficiency, illustrations and descriptions herein show seismic receivers located on streamers, but it should be understood that references to seismic receivers located on a "streamer" or "cable" should be read to refer equally to seismic receivers located on a towed streamer, an ocean bottom receiver cable, and/or an array of nodes.

FIG. 1 shows an expanding, spherical acoustic signal, illustrated as semicircles of increasing radius centered at the source 126, representing a down-going wavefield 128, following an acoustic signal emitted by the source 126. The down-going wavefield 128 is, in effect, shown in a vertical plane cross section in FIG. 1. The outward and downward expanding down-going wavefield 128 may eventually reach the solid surface 104, at which point the outward and downward expanding down-going wavefield 128 may partially scatter, may partially reflect back toward the streamers 120, and may partially refract downward into the solid volume 106, becoming elastic acoustic signals within the solid volume 106.

Figure 2:
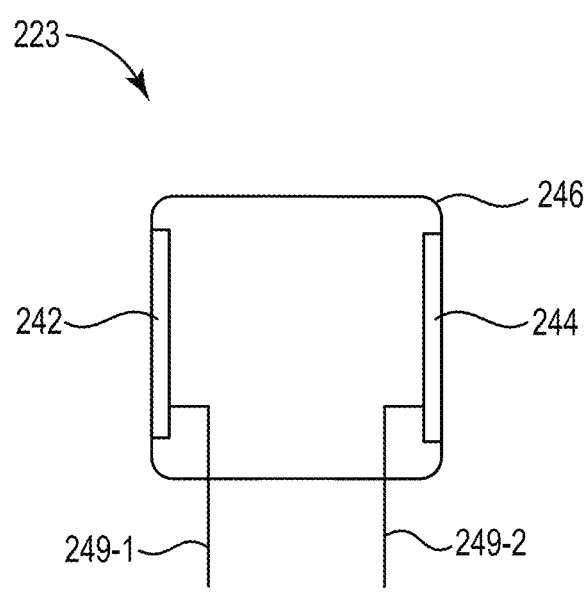
FIG. 2 illustrates a schematic diagram of a hydrophone.

FIG. 2 illustrates a schematic diagram of a hydrophone 223. The hydrophone 233 can be analogous to the receiver 122 illustrated in FIG. 1. Alternatively, the hydrophone 223 can be a component of receiver 122 illustrated in FIG. 1. The hydrophone 223 can be a bender-type hydrophone that includes detectors that deflect in response to pressure or particle motion. FIG. 2 shows the hydrophone 223 including a first detector 242 and a second detector 244 coupled to a housing 246. The housing 246 can comprise a metal, such as brass. FIG. 2 shows the lead 249-1 coupled to the first detector 242 and the lead 249-2 coupled to the second detector 244. However, embodiments of the present disclosure are not so limited to a particular coupling of the leads 248-1 and 248-2 or the leads 249-1 and 249-2 to the first detector 242, the second detector 244, or the housing 246.

The first detector 242 and the second detector 244 can comprise a piezoelectric material, such as a piezoceramic. In the example of FIG. 2, the sensitivity of the first detector 242 is matched with the sensitivity of the second detector 244. For example, the sensitivity of the first detector 242 and the sensitivity of second detector can be 20 V/bar, or as close to 20 V/bar as equipment and processes are capable of achieving.

A detector comprising a piezoelectric material can generate an electric potential when a surface is subjected to an external force, such as a pressure. The sensitivity of a detector can be a function of the capacitance of the detector. Thus, matching the sensitivity of the first detector 242 with the sensitivity of the second detector 244 can include selecting the first detector 242 and the second detector 244 such that a capacitance of the first detector 242 is equal to a capacitance of the second detector 244. The capacitance of a detector can be dependent on the physical dimensions, such as the size and weight, of the detector. Thus, matching the sensitivity of the first detector 242 with the sensitivity of the second detector 244 can include selecting the first detector 242 and the second detector 244 such that they have similar sizes, weights, or sizes and weights.

Figure 3A:
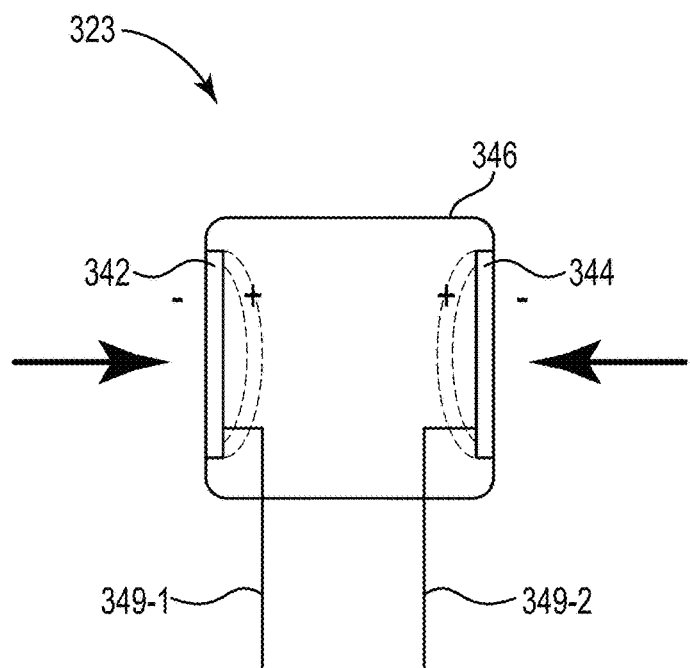
FIG. 3A illustrates a schematic diagram of a hydrophone subjected to pressure.

FIG. 3A illustrates a schematic diagram of a hydrophone 323 subjected to pressure. The hydrophone 323 can be analogous to the hydrophone 223 illustrated in FIG. 2. FIG. 3A shows the lead 349-1 coupled to the first detector 342 and the lead 349-2 coupled to the second detector 344. However, embodiments of the present disclosure are not limited to a particular coupling of the leads 348-1 and 348-2 or the leads 349-1 and 349-2 to the first detector 342, the second detector 344, or the housing 346. The lead 349-1 can be used to measure the electric potential generated by the first detector 342 and the lead 349-2 can be used to measure the electric potential generated by the second detector 344.

FIG. 3A shows the effect of a compressive pressure, hereinafter referred as pressure and illustrated by the arrows on the first detector 342 and the second detector 344. The pressure may also be referred to as an increase in pressure from a previous state. That is, the external pressure is greater than an internal pressure of the hydrophone 323. The pressure causes the first detector 342 and the second detector 344 to deflect in the direction of the pressure as indicated by the dashed outlines of the first detector 342 and the second detector 344. In other words, the first detector 342 and the second detector 344 deflect in opposite directions and into the housing 346. The dashed outlines are not drawn to scale and do not illustrate the actual amount of deflection. In the example of FIG. 3A, respective sides of the first detector 342 and the second detector 344 toward which the deflection occurs generate a positive electric potential as indicated by the plus sign (+), and respective sides of the first detector 342 and the second detector 344 away from which the deflection occurs generate a negative electric potential as indicated by the minus sign (−). Thus, when the hydrophone 323 is subjected to pressure, the electric potential across the leads 349-1 and 349-2 is positive. However, embodiments are not so limited. For example, the first detector 342 and the second detector 344 can be configured such that the polarity of the electric potentials generated in response to the deflection could be reversed.

Figure 3B:
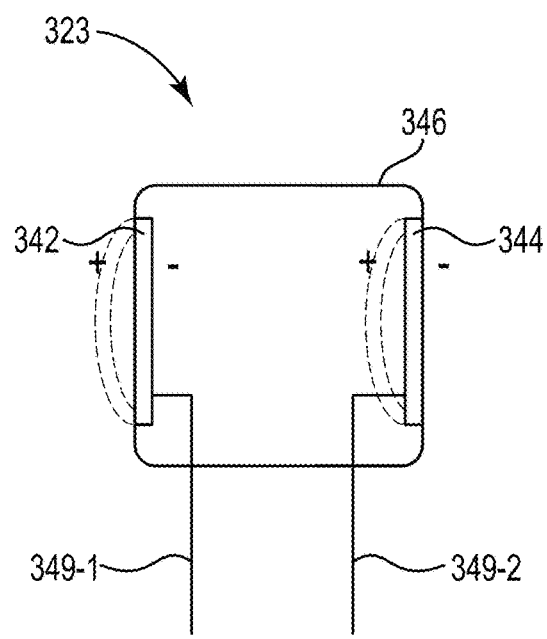
FIG. 3B illustrates a schematic diagram of a hydrophone subjected to acceleration.

FIG. 3B illustrates a schematic diagram of a hydrophone 323 subjected to acceleration. The hydrophone 323 illustrated in FIG. 3B is the same hydrophone 323 illustrated in FIG. 3A. FIG. 3B shows the effect of acceleration on the first detector 342 and the second detector 344. The first detector 342 and the second detector 344 can deflect relative to the housing 346. When the hydrophone 323 is subjected to acceleration, the first detector 342 and the second detector 344 can both deflect in the same direction as indicated by the dashed outlines of the first detector 342 and the second detector 344. The dashed outlines are not drawn to scale and do not illustrate the actual amount of the deflecting. Where the hydrophone 323 is, for example, a component of a receiver on a streamer, such as the receiver 122 on the streamer 120 illustrated in FIG. 1, vibrations of the streamer can cause the hydrophone 323 to be subjected to acceleration.

The sides of the first detector 342 and the second detector 344 coupled to the leads 349-1 and 349-2 can generate electric potentials with a polarities when the hydrophone 323 is subjected to acceleration. For example, the side of the first detector 342 coupled to the lead 349-1 can generate a negative electric potential and the side of the second detector coupled to the lead 349-2 can generate a positive electric potential. Because the sensitivities of the first detector 342 and the second detector 344 are matched, the absolute value of the magnitudes of the electric potentials generated by the respective sides of the first detector 342 and the second detector 344 can be nearly the same. Thus, the electric potential across the leads 349-1 and 349-2 (the sum of the electric potentials generated by the first detector 342 and the second detector 344) can be zero, or near zero, when the hydrophone 323 is subjected to acceleration.

Although FIGS. 3A and 3B illustrate the hydrophone 323 being subjected to either pressure or acceleration, the hydrophone 323 can be simultaneously subjected to pressure and acceleration. The electric potential across the leads 349-1 and 349-2 can be considered as a combination of the electric potentials generated by the first detector 342 and the second detector 344 in response to pressure and the electric potentials generated by the first detector 342 and the second detector 344 in response to acceleration. Thus, the electric potentials generated by the first detector 342 and the second detector 344 in response to acceleration can be noise that is introduced into the output signal of the hydrophone 323. However, because the portion of the electric potential generated by the first detector 342 in response to acceleration and the portion of the electric potential generated by the second detector 344 in response to acceleration can have approximately the same magnitude but opposite polarities, the portions of the electric potentials generated by the first detector 342 and the second detector 344 in response to acceleration can cancel each other out.

Figure 4:
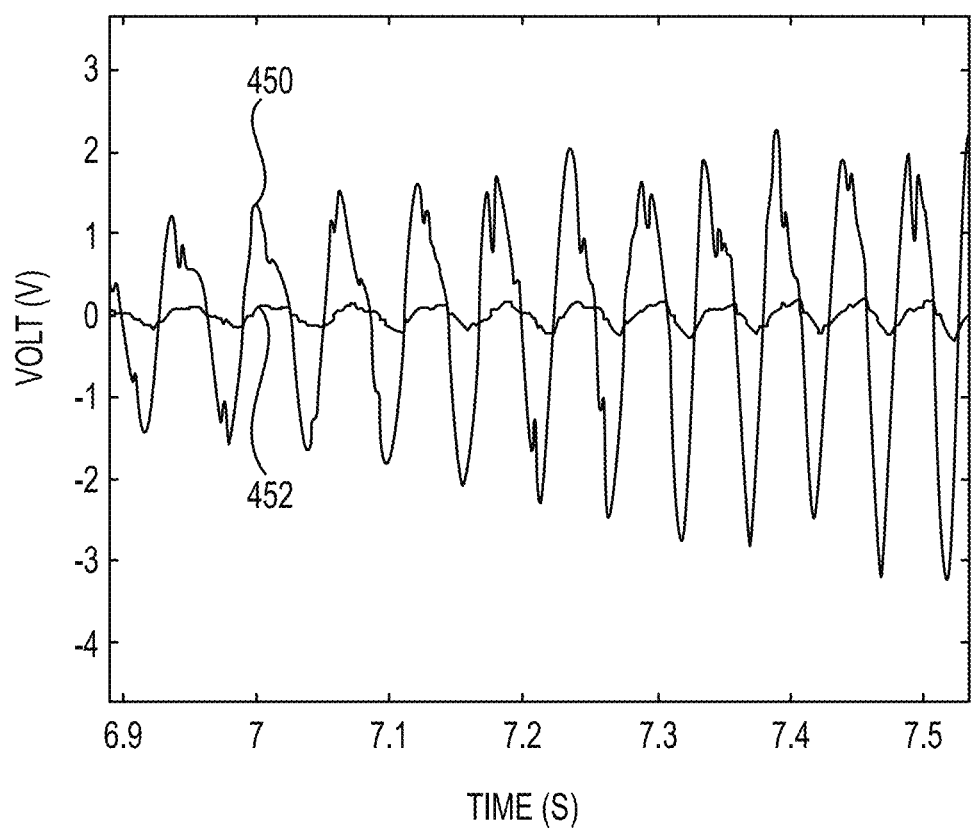
FIG. 4 illustrates a time signal graph of lab test data of a geophone and lab test data of a hydrophone demonstrating the susceptibility of the hydrophone to acceleration.

FIG. 4 illustrates a time signal graph 451 of lab test data 450 of a geophone and lab test data 452 of a hydrophone demonstrating the susceptibility of the hydrophone to acceleration. The lab test data 452 corresponds to the output signal of the hydrophone. The vertical axis indicates the magnitude of the lab test data 450 and 452 in volts (V). The horizontal axis indicates the time into the lab test in seconds (s). The lab test data 450 and 452 were generated by the geophone and the hydrophone while on a shaker table. That is, the geophone and the hydrophone were subjected to accelerations applied in opposite directions over time. In this example, the lab test data 450 of the geophone illustrates the velocity of the geophone and the lab test data 452 illustrates the acceleration of the hydrophone during the test. The lab test data 450 of the geophone illustrates the alternating (and increasing) velocity caused by the shaker table shaking in alternating directions over time. The lab test data 452 of the hydrophone illustrates the alternating (and increasing) acceleration caused by the shaker table shaking in alternating directions over time. The hydrophone that generated the lab test data 452 is analogous to the hydrophone 323 illustrated in FIGS. 3A and 3B. The time signal graph 451 still shows magnitude of the lab test data 452 of the hydrophone varying over time in response to acceleration. The lab test data 452 of the hydrophone includes alternating increases and decreases in magnitude that have peaks and valleys that generally line up with the changes in parts of the graph indicating changes in the velocity from the lab test data 450 from the geophone corresponding to accelerations. Thus, the lab test data 452 of the hydrophone has its largest magnitude when the acceleration applied by the shaker table has the largest magnitude. This indicates that the hydrophone is susceptible to acceleration, even though it is intended to measure pressure, not acceleration.

Figure 5:
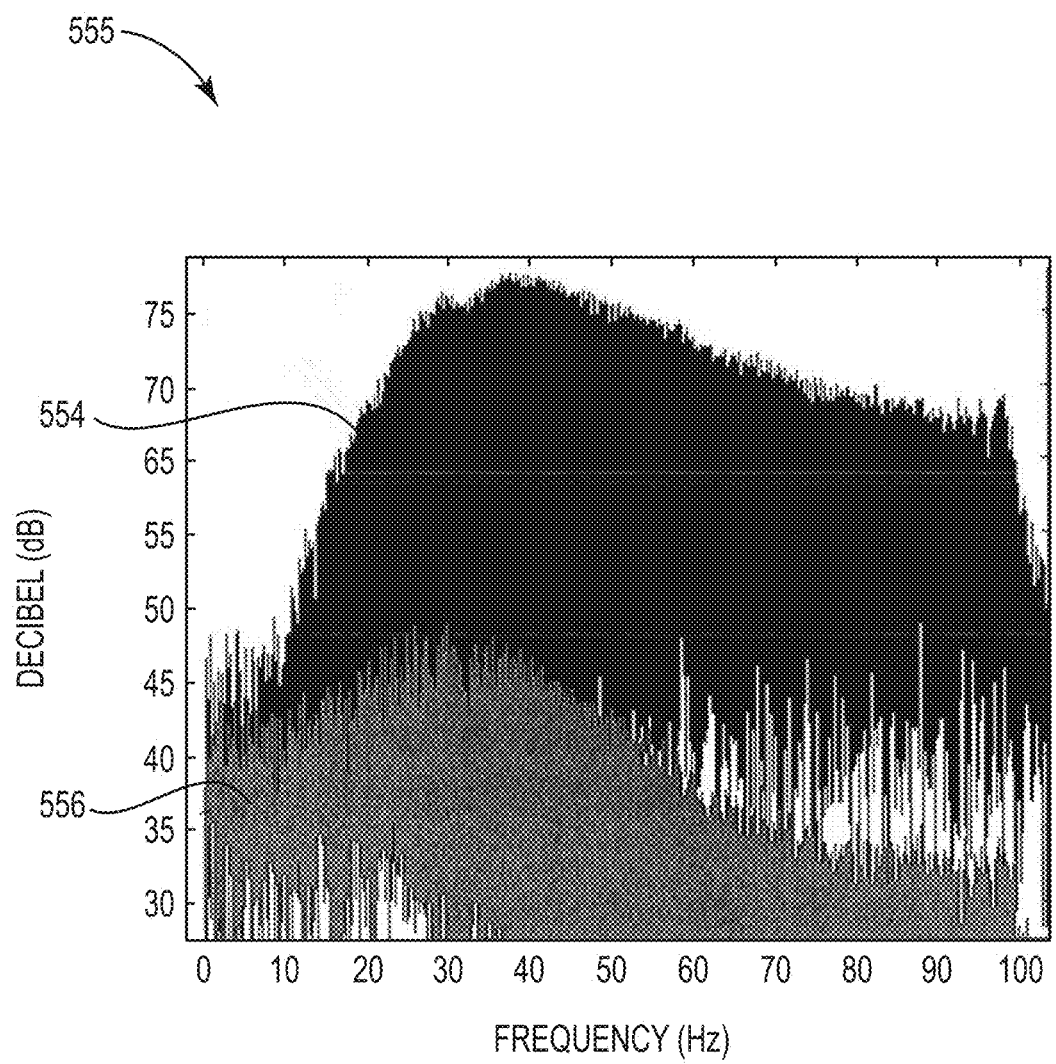
FIG. 5 illustrates a frequency spectrum graph of lab test data of a geophone and lab test data of a hydrophone demonstrating the susceptibility of the hydrophone to acceleration.

FIG. 5 illustrates a frequency spectrum graph 555 of lab test data 554 of a geophone and lab test data 556 of a hydrophone demonstrating the susceptibility of the hydrophone to acceleration. The lab test data 554 illustrates the sensitivity of the geophone to velocity and the lab test data 556 illustrates the sensitivity of the hydrophone to acceleration. The lab test data 554 and 556 were generated by the geophone and the hydrophone while on a shaker table. That is, the geophone and the hydrophone were subjected to accelerations applied in opposite directions over time. The vertical axis of a frequency spectrum graph 555 indicates the magnitude of the lab test data 554 and 556 in decibels (dB). The horizontal axis indicates the frequency of the shaker table in hertz (Hz). Decibels are used to compare the relative sensitivity of the hydrophone to acceleration to the relative sensitivity of the geophone to acceleration. The magnitude of the lab test data 554 increases until the frequency of the shaker table is so high (approximately 40 Hz) that the sensitivity of the geophone lags behind the frequency of the shaker table. Similar to the magnitude of the lab test data 554, the magnitude of the lab test data 556 increases until the frequency of the shaker table is so high (approximately 35 Hz) that the sensitivity of the hydrophone to acceleration lags behind the frequency of the shaker table. Note that there is a 90-degree phase shift between the lab test data 554 and the lab test data 556 because the lab test data 554 of the geophone corresponds to velocity whereas because the lab test data 556 of the hydrophone corresponds to acceleration. The hydrophone that generated the lab test data 556 is analogous to the hydrophone 323 illustrated in FIGS. 3A and 3B. Although the lab test data 556 of the hydrophone has lesser magnitudes than that of the lab test data 554, the lab test data 556 includes increases and decreases in magnitude that generally follows the similar shape of the lab test data 554. That is, the magnitude of the lab test data 554 and 556 increases until a frequency of approximately 35 Hz and then decreases by approximately 10 dB from approximately 35 to 100 Hz. This indicates that the hydrophone is susceptible to acceleration, even though it is intended to measure pressure, not acceleration.

FIG. 6A illustrates a schematic diagram of a first array 660 of hydrophones. The first array 660 includes the hydrophones 623-1a, 623-2a, 623a, 623-4a, 623-5a through 623-M. FIG. 6B illustrates a schematic diagram of a second array 662 of hydrophones. The second array 662 includes the hydrophones 623-1b, 623-2b, 623b, 623-4b, 623-5b through 623-N. Although FIGS. 6A and 6B shows a hydrophone system comprising the first array 660 and the second array 662, each comprising at least six hydrophones, the first array and the second array 662 can comprise any quantity of the hydrophones and the hydrophone system can comprise more than two arrays of hydrophones. It can be beneficial for an array to comprise between eight and sixteen of the hydrophones 623 to reduce noise in the output signal caused by interference between the hydrophones 623. In at least one embodiment, the first array 660 or the second array 662 can comprise a single hydrophone such as the hydrophone 623-1a or 623-1b. The hydrophones 623-1a through 623-M and 623-1b through 623-N are referred to collectively as the hydrophones 623 and can be analogous to the hydrophone 323 illustrated in FIGS. 3A and 3B. The first array 660 can comprise a different quantity of the hydrophones 623 than the second array 662.

As shown in FIGS. 6A and 6B, the first detectors of the hydrophones 623-1a through 623-M can be coupled together in parallel with the second detectors of the hydrophones 623-1a through 623-M. For example, the lead 649-1 of each of the hydrophones 623-1a through 623-M can be directly coupled together and the lead 649-2 of each of the hydrophones 623-1a through 623-M can be directly coupled together. Similarly, the first detectors of the hydrophones 623-1b through 623-N can be coupled together in parallel with the second detectors of the hydrophones 623-1b through 623-N. For example, the lead 649-1 of each of the hydrophones 623-1b through 623-N can be directly coupled together and the lead 649-2 of each of the hydrophones 623-1b through 623-N can be directly coupled together.

In at least one embodiment, the combined sensitivity of the first array 660 can match the combined sensitivity of the second array 662. Matching the combined sensitivity of the first array 660 with the combined sensitivity of the second array 662 can include selecting the hydrophones 623 of the first array 660, of the second array 662, or both the first array 660 and the second array 662 such that the combined sensitivity of the first array 660 is equal to the combined sensitivity of the second array 662.

In at least one embodiment, matching the combined sensitivity of the first array 660 with the combined sensitivity of the second array 662 can include selecting the first array 660 and the second array 662 such that the combined sensitivity of the first array 660 is equal to the combined sensitivity of the second array 662. For example, the first array 660 and the second array 662 can be selected from the plurality of arrays of hydrophones, each having a predetermined combined sensitivity, such that the combined sensitivity of the first array 660 is equal to the combined sensitivity of the second array 662. In at least one embodiment, the first array 660 and the second array 662 can be selected from a pool of streamers or streamer sections, each streamer or streamer section comprising an array of hydrophones having a predetermined combined sensitivity such that the combined sensitivity of the first array 660 is equal to the combined sensitivity of the second array 662.

In at least one embodiment, the combined sensitivities of the hydrophones 623 of the first array 623 can be matched such that a measurement of the combined sensitivity of the first array 660 is a particular value within a certainty. For example, if the combined sensitivity of the first array 660 is to be 20 V/bar, then the hydrophones 623 of the first array 660 can be selected such that a measurement of the combined sensitivity of the first array 660 is 20 V/bar or as close to 20 V/bar as equipment and processes are capable of achieving within the certainty.

The second array 662 can comprise the hydrophones 623-1b through 623-N such that the combined sensitivity of the second array 662 is matched with the combined sensitivity of the first array 660. That is, a measurement of the combined sensitivity of the second array 662 is equal to the particular value within the certainty. For example, if the combined sensitivity of the first array 660 is to be 20 V/bar, then the hydrophones 623 of the second array 662 can be selected such that a measurement of the second array 662 is 20 V/bar, or as close to the particular combined sensitivity as equipment and processes are capable of achieving within the certainty. However, the combined sensitivity of a first hydrophone of an array, such as the hydrophone 623-1a of the first array 660 may be different than the combined sensitivity of a second hydrophone of the same array, such as the hydrophone 623-2a of the first array 660. That is, the first array 660 and the second array 662 can comprise hydrophones 623 that have different combined sensitivities even though the first array 660 and the second array 662 have the same combined sensitivity. In at least one embodiment, the first array 660 can be a component of a first streamer, such as the streamer 120 illustrated in FIG. 1, and the second array 662 can be a component of a second streamer. In at least one embodiment, the first array 660 and the second array 662 can be components of a single streamer.

Figure 7:
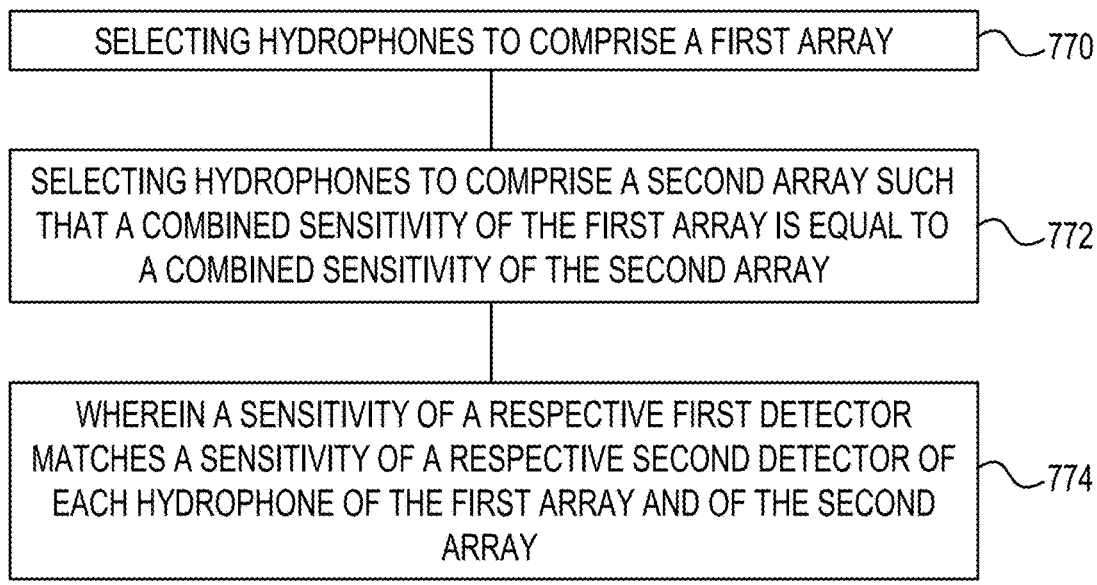
FIG. 7 illustrates a method for measuring pressure with a first and a second array of hydrophones where the combined sensitivity of the first array matches the combined sensitivity of the second array.

FIG. 7 illustrates a method for measuring pressure with a first and a second array of hydrophones where the combined sensitivity of the first array matches the combined sensitivity of the second array. The method can comprise, at block 770, selecting hydrophones to comprise a first array. The method can comprise, at block 772, selecting hydrophones to comprise a second array such that a combined sensitivity of the first array is equal to a combined sensitivity of the second array. As indicated at block 774, a sensitivity of a respective first detector matches a sensitivity of a respective second detector of each hydrophone of the first array and of the second array.

Although not illustrated in FIG. 7, the method can include measuring pressure with a first array of hydrophones and measuring pressure with a second array of hydrophones. The method can include selecting hydrophones to comprise the first array such that a measurement of the combined sensitivity of the first array is equal to a particular value within a certainty and selecting hydrophones to comprise the second array such that as measurement of the combined sensitivity of the second array is the particular value within the certainty. The method can include selecting the first array from a plurality of arrays of hydrophones such that a measurement of the combined sensitivity of the first array is equal to a particular value within a certainty and selecting the second array from the plurality of arrays such that a measurement of the combined sensitivity of the second array is equal to the particular value within the certainty. The method can include selecting the first array and the second array from a plurality of arrays of hydrophones such that the combined sensitivity of the first array and the combined sensitivity of the second array are a particular combined sensitivity. A capacitance of the respective first detector can match with a capacitance of the respective second detector.

In accordance with a number of embodiments of the present disclosure, a geophysical data product may be produced. The geophysical data product may include, for example, field data recorded during a survey utilizing the above-described equipment, systems and techniques. Geophysical data may be obtained and stored on a non-transitory, tangible computer-readable medium. In some instances, geophysical analysis may be performed on the geophysical data product offshore according to techniques described herein or known in the art, and stored on a computer-readable medium, to produce an enhanced geophysical data product. The geophysical analysis can include determining a seismic image of a formation and determining the presence of a hydrocarbon in the formation.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
   a first array of hydrophones; and
   a second array of hydrophones,
   wherein each of the hydrophones comprises:
      a first detector; and
      a second detector,
      wherein a sensitivity of the first detector is matched with a sensitivity of the second detector, and wherein a combined sensitivity of the first array of hydrophones is matched with a combined sensitivity of the second array of hydrophones.

2. The system of claim 1, wherein a combined sensitivity of a first hydrophone of the first array is different than a combined sensitivity of a second hydrophone of the first array.

3. The system of claim 1, wherein the first detector and the second detector are oriented to generate electric potentials with opposite polarities when each of the hydrophones is subjected to acceleration.

4. The system of claim 1, wherein the first detector and the second detector comprise a piezoelectric material.

5. The system of claim 1, wherein each of the hydrophones is a bender-type hydrophone.

6. The system of claim 1, wherein the first and second arrays comprise at least eight hydrophones and at most sixteen hydrophones.

7. A method, comprising:
selecting hydrophones to comprise a first array; and
selecting hydrophones to comprise a second array such that a combined sensitivity of the first array is equal to a combined sensitivity of the second array,
wherein a sensitivity of a respective first detector matches a sensitivity of a respective second detector of each hydrophone of the first array and of the second array.

8. The method of claim 7, further comprising:
measuring pressure with the first array of hydrophones; and
measuring pressure with the second array of hydrophones.

9. The method of claim 7, further comprising:
selecting hydrophones to comprise the first array such that a measurement of the combined sensitivity of the first array is equal to a particular value within a certainty; and
selecting hydrophones to comprise the second array such that a measurement of the combined sensitivity of the second array is equal to the particular value within the certainty.

10. The method of claim 7, further comprising:
selecting the first array from a plurality of arrays of hydrophones; and
selecting the second array from the plurality of arrays of hydrophones such that the combined sensitivity of the first array is equal to the combined sensitivity of the second array.

11. The method of claim 7, further comprising:
selecting the first array from a plurality of arrays of hydrophones such that a measurement of the combined sensitivity of the first array is equal to a particular value within a certainty; and
selecting the second array from the plurality of arrays of hydrophones such that a measurement of the combined sensitivity of the second array is equal to the particular value within the certainty.

12. The method of claim 7, wherein a capacitance of the respective first detector matches a capacitance of the respective second detector.

13. A system, comprising:
a first array of hydrophones having a first combined sensitivity; and
a second array of hydrophones having a second combined sensitivity, wherein the second combined sensitivity matches the first combined sensitivity, and
wherein each hydrophone of the first array and the second array is configured to generate opposing electric potentials when subjected to acceleration.

14. The system of claim 13, wherein each hydrophone of the first array and the second array comprises:
a first detector configured to generate a first one of the opposing electric potentials; and
a second detector configured to generate a second one of the opposing electric potentials.

15. The system of claim 14, wherein the first detectors of the first array are coupled together in parallel with the second detectors of the first array, and
wherein the first detectors of the second array are coupled together in parallel with the second detectors of the second array.

16. The system of claim 13, wherein the first and second arrays are components of a single streamer.

17. The system of claim 13, wherein the first array is a component of a first streamer and the second array is a component of a second streamer.

18. The system of claim 13, wherein the first array comprises a first quantity of the hydrophones and the second array comprises a second quantity of the hydrophones.

19. A method of manufacturing a geophysical data product, the method comprising:
obtaining geophysical data, the geophysical data product comprising marine survey data obtained with a first array of hydrophones and a second array of hydrophones,
wherein each of the hydrophones comprises:
a first detector; and
a second detector, wherein a sensitivity of the first detector is matched with a sensitivity of the second detector, and
wherein a combined sensitivity of the first array of hydrophones is matched with a combined sensitivity of the second array of hydrophones,
processing the geophysical data to generate the geophysical data product; and
recording the geophysical data product on a non-transitory machine-readable medium.

20. The method of claim 19, wherein processing the geophysical data comprises processing the geophysical data offshore or onshore.

* * * * *